March 30, 1926.  
E. L. PARKINS  
ADJUSTABLE FRAME  
Filed Sept. 1, 1925  
1,578,357
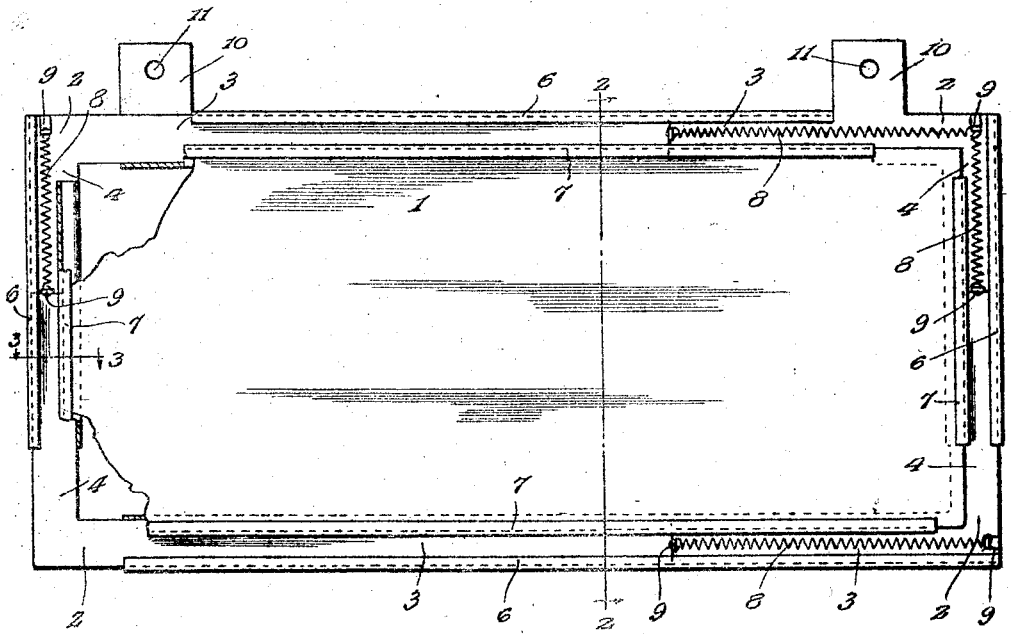
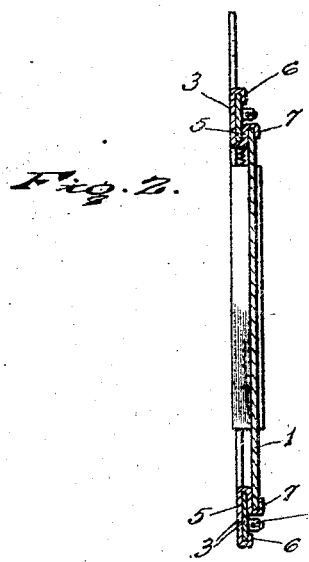
Inventor  
E. L. Parkins.  
By *Lacey & Lacey*, Attorneys Patented Mar. 30, 1926.

1,578,357

UNITED STATES PATENT OFFICE.

ERNIE L. PARKINS, OF CRAIGMONT, IDAHO.

ADJUSTABLE FRAME.

Application filed September 1, 1925. Serial No. 53,879.

*To all whom it may concern:*

Be it known that I, ERNIE L. PARKINS, a citizen of the United States, residing at Craigmont, in the county of Lewis and State of Idaho, have invented certain new and useful Improvements in Adjustable Frames, of which the following is a specification.

This invention relates to a frame which is primarily intended to receive a license plate such as are provided upon automobiles and other motor vehicles, but may also be used to carry show cards and the like.

One object of the invention is to so form the frame that it may be extended and contracted and thereby permit the license plate or show card to be easily taken out and a new one put in place.

Another object of the invention is to provide improved flanges which will serve, not only as means to guide the sliding movement of the frame forming sections towards and away from each other, but also, constitute means to engage the edge portions of the license plate or card and securely hold it in the frame.

Another object of the invention is to so mount the springs which yieldably retain the frame forming sections retracted that they will extend longitudinally of the sides and ends of the frame and permit the sections to be easily drawn apart and then returned to a card engaging position.

This invention is illustrated in the accompanying drawings wherein:

Figure 1 is a view showing the frame in rear elevation with a license tag mounted in the frame.

Figure 2 is a transverse sectional view taken along the line 2—2 of Figure 1.

Figure 3 is a sectional view taken along the line 3—3 of Figure 1.

The frame which is open so that it may be disposed about the license tag or card 1 is formed with corner sections 2 having side and end arms 3 and 4 which extend at right angles to each other and in overlapping relation to the arms of co-operating corner sections. These corner sections are to have their arms retained in telescopic engagement with the arms of the co-operating sections and therefore there have been provided inner and outer flanges 5 and 6 which are formed by bending side extensions of the arms into overlying relation to the outer faces of the arms. From an inspection of Figures 2 and 3 it will be seen that the flanges of one arm overlie the side edge portions of the arm with which it engages and will serve to guide sliding movement of the sections towards and away from each other and prevent the sections from becoming disconnected. The inner flanges 5 are bent back upon themselves to form auxiliary flanges 7 adapted to engage the license plate and very securely mount the license plate in the frame. It will be understood that before the license plate can be inserted in the frame the sections must be drawn apart and the license plate put in place in engagement with the flanges 7 of certain of the corner sections and the other sections then retracted so that other flanges 7 will engage the license plate and cause the plate to be firmly anchored in the frame. In order to cause the sections of the frame to be normally retracted and securely held in engagement with the license plate there have been provided springs 8 which extend longitudinally of the arms 3 and 4 with their ends engaged with lugs 9 carried by the corner sections. These lugs are formed as tongues which extend outwardly from the sections and certain of the lugs or tongues are disposed at the ends of the arms while others are at the corners of the frame. It will therefore be seen that the springs will extend longitudinally of the sides and ends of the frame between the side flanges 5 and 6 and will serve very effectively to permit expansion of the frame and then retract the sections for engagement with the edge portions of a license plate inserted while the frame is expanded. Tongues 10 extend upwardly from one of the side arms 3 at opposite ends of its outer flange 6 and are formed with openings 11 through which fasteners may pass to attach the frame to the automobile.

Having thus described the invention, what I claim is:

1. A frame comprising corner sections each having arms extending at right angles to each other and extending in longitudinal overlapping relation to co-operating arms of other corner sections, certain of the arms of said sections having inner and outer side flanges extending inwardly and engaging the co-operating arms in spaced relation to each other and serving to guide sliding movement of the sections towards and away from each other, said inner flanges having their free side portions bent back upon themselves to provide auxiliary flanges to engage the edge portions of a card enclosed by said sections, lugs extending from said sections intermediate the side of their arms, and springs extending longitudinally of the arms between said inner and outer flanges and anchored to said lugs and serving to yieldably hold the sections against movement away from each other.

2. A frame comprising corner sections, each having diverging arms held in slidable engagement with co-operating arms of companion sections by inturned side flanges and having movement longitudinally of each other to expand and contract the frame, the arms of said sections being formed with means adapted to engage the marginal portions of a card and hold the card in the frame, lugs extending from said sections intermediate the sides of their arms, certain of the lugs being disposed at the free ends of the arms and others at the joined ends of the arms, and springs extending longitudinally of the arms between the flanges and anchored to said lugs and serving to yieldably resist expansion of the frame.

3. A card-holding frame comprising corner sections, each having a horizontally extending arm and a vertically extending arm projecting therefrom, the horizontally and vertically disposed arms of companion corner sections being overlapped and slidable longitudinally of each other by inturned side flanges and forming a rectangular frame adapted to be expanded and contracted, springs extending longitudinally of said arms between the side flanges and anchored at the intersection of the arms of certain of said corner sections and to the free ends of the arms of cooperating sections to yieldably resist expansion of the frame, and tongues extending from a horizontal arm forming a portion of the upper portion of said frame and adapted to be secured to a support and suspend the frame therefrom.

In testimony whereof I affix my signature.

ERNIE L. PARKINS.